Feb. 26, 1957  R. STEENECK  2,783,100
SELF-ADJUSTING AUXILIARY BEARING
Filed Sept. 5, 1952

INVENTOR.
R. STEENECK
BY
ATTORNEY

United States Patent Office 2,783,100
Patented Feb. 26, 1957

2,783,100

SELF-ADJUSTING AUXILIARY BEARING

Robert Steeneck, New York, N. Y., assignor to The Western Union Telegraph Company, New York, N. Y., a corporation of New York Application September 5, 1952, Serial No. 308,073

10 Claims. (Cl. 308—15)

This invention relates to an improvement in shaft supporting bearings and more particularly to a device which provides dynamic support against recurrent flexural impulses.

The invention described is particularly advantageous in that it supplies intermediate and overhanging shaft support in a bearing which combines inherent self-adjustment for shaft directional misalignment with concurrent self-accommodation of shaft lateral displacement.

Fixed bearings previously employed as self-aligning shaft supports have had a maximum per-shaft limit of two such bearings, if precise preparation and location of the bearing seats were to be avoided, in order to prevent shaft bending and consequent binding due to lateral misalignment. Those self-aligning bearings which are not fixed but are retained by resilient members such as springs or rubber blocks will, under the same conditions, impose a constant bending stress on the shaft, which promotes fatigue failure in the rotating shaft and constitutes a continual force tending to produce misalignment. Such resilient and flexibly mounted bearings offer little resistance to shaft vibrations induced by static or dynamic rotational unbalance, and no protection against shock.

One of the objects of this invention is to utilize the non-dissipative energy storage properties of a viscous, deformable, plastic medium for the reduction of shaft dynamic vibrations, in a structure which employs the fluidity of the same medium to accommodate structural errors in shaft-bearing geometry.

Another object of this invention is to provide a simplified self-adjusting bearing support for a shaft the location of which is subject to moderate repositioning adjustment.

A further object of this invention is to provide a self-adjusting shaft bearing structure offering protection against radial shaft stresses of a time-variable nature, such as impact and shock.

A still further object of this invention is to provide a means of suppressing flexural shaft vibrations, in a device having simplified requirements for its mounting.

Mounting of the bearing described can be successfully undertaken on surfaces which are in the rough or as-cast condition, avoiding the necessity for machining them and resulting in more economical construction, more rapid construction, a lesser requirement for skilled labor in construction, and a lesser requirement for the availability and for the extended use of precision machining equipment. In those cases where such machining is unduly difficult, this invention will enable designs to be used which would otherwise be impractical to construct.

Because of its completely self-adjusting nature the bearing of this invention may be freely employed as a protective device in circumstances not requiring its continuous performance as a bearing, without fear of adding undue construction difficulties, shaft friction or misalignment stresses, and solely for the protection of the shaft and associated equipment from the effects of vicarious impact, thus improving ruggedness and reliability of the assembly.

Other objects and advantages of the invention will be apparent from the following detailed description of two illustrative embodiments thereof, taken in connection with the accompanying drawings, in which.

Figure 1:
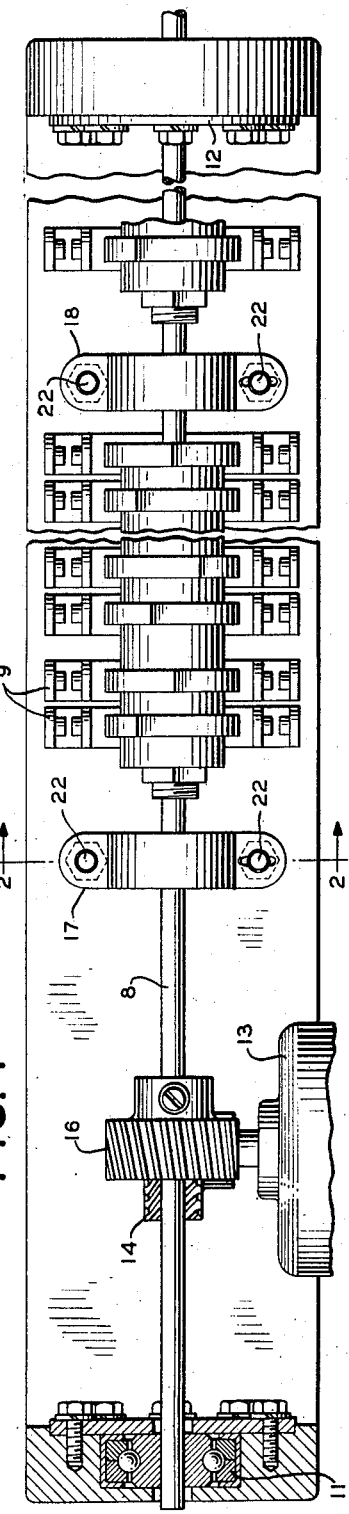
Fig. 1 is a plan view of a shaft assembly including self-adjusting bearings embodying the principles of the invention.

Referring to Fig. 1, 8 is a shaft used, for example, to operate electrical contact assemblies 9 or other load device, retained in fixed bearings 11 and 12, and rotated above motor speed by motor 13 through intermeshed spiral gears 14 and 16 attached to the motor spindle and to said shaft respectively. Self-adjusting auxiliary bearings 17 and 18 in accordance with one embodiment of the invention are shown in use as mid-bearings, although it is to be understood that these bearings may also advantageously be used as end bearings if desired.

Figure 2:
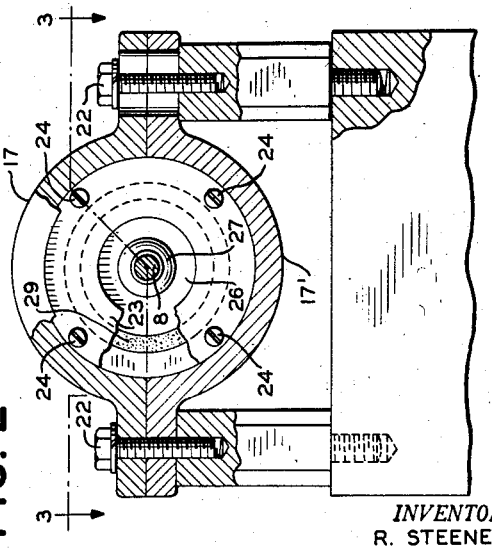
Fig. 2 is a vertical section taken on line 2—2 of Fig. 1.

In Fig. 2, reference numerals 17 and 17' designate upper and lower parts, respectively, of an exterior bearing retainer which is fixed in position by mounting screws 22. Two identical recessed plates 23 are joined by screws 24 and secured by the shoulders of a recess in exterior bearing retainers 17 and 17'.

Figure 3:
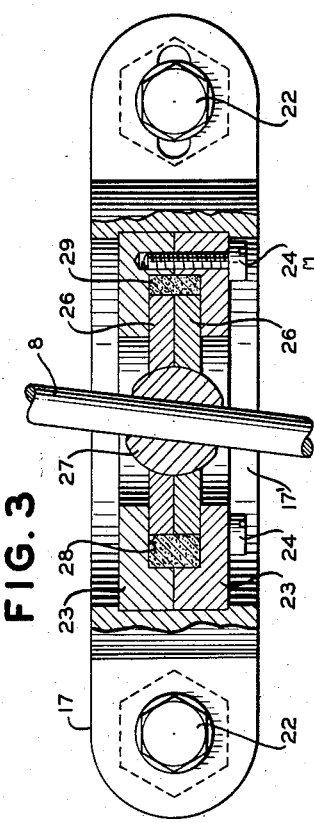
Fig. 3 is a section taken on line 3—3 of Fig. 2.

A bearing member 27 whose cylindrical inner surface supports the journal of the shaft 8, has its exterior formed in the shape of the mid-zone of a sphere, as seen more clearly in Fig. 3. Mating elements 26 form a bearing retainer having an inner concave spherical surface engaging said bearing 27 and supporting it radially while permitting its axis to be cocked into coincidence with that of a skewed shaft. This bearing retainer consists of separable portions 26 forming a parallel-sided plate, which slidably engages to partial depth, the parallel sides of a recess 28 in the inner surface of two plate members 23 which together form a perforated mounting plate. The remaining depth of said recess 28 permits controlled lateral motion of the bearing retainer 26 by displacement of a viscous, deformable plastic substance 29 contained in and substantially filling the remainder of said recess. Slow lateral motion of the retainer, as imparted by permanent alignment requirements, is permitted by compound creep or viscous deformation. Any rapid deflection due to periodic vibratory or to impact load is opposed by viscous damping in the material, which tends to retain the bearing, shaft and retainer in their original positions. An example of such a substance is polymerized methyl silicone, variously termed "silicone putty," "bouncing putty" and "silly putty" from its ability to demonstrate the overt mechanical characteristics of either india rubber or putty, depending upon the velocity of an applied impact. The mode of mounting bushing 27 permits free angular displacement of the axis of its bore, while the slidable retention of plates 26 in the recess of plates 23 affords free lateral movement of the assembly subject only to the displacement of polymer 29, thus providing a self-aligning and self-centering bearing structure.

The polymeric material referred to above is operative over a wide range of its physical characteristics, the only one of which having controlling importance for general application to the instant invention being its viscosity. Volume and configuration of the material in place and its density, size of the retained shaft and its speed of rotation, the frequency spectrum, amplitude and phase relationship of the components of imposed vibration and impact, operating temperatures and viscosity index of the compound, all have an important influence on the selection of an appropriate compound viscosity in particular instances. The frequency of vibration desired to be suppressed in relation to the rapidity of repositioning action needed will also influence the selection of compound viscosity from a wide range of operative values. For example, a small diameter shaft rotating at high speed and subject to rapid sidewise displacement for clutching purposes requires a fluid plastic medium of low viscosity (in poises, log=2 approximately) while a large slow speed shaft such as a nautical propeller shaft making use of an auxiliary bearing only to prevent shaft whip if the shaft should accidentally become sprung, as by the propeller striking an obstruction, and which utilizes lateral self-positioning only for convenience of installation and to compensate for slow misalignment due to change of the vessel's shape, requires a plastic having a high viscosity (in poises, log=8 approximately). Another deformable plastic having similar properties of viscosity and elasticity is polyisobutylene.

Where isolation of the shaft from transmission of vibration and the absorption of impact stresses are not required, deformable plastic materials in the range of viscosities (in poises, log=2 approximately to log=7 approximately) but having less elasticity can be used satisfactorily while retaining the advantages of shaft support for vibration suppression. These materials include microcrystalline wax of melting point selected to define the desired viscosity, asphaltum, with or without filling materials, plasticized and over plasticized ethyl cellulose, coal tar pitch, and mixtures of rosin and castor oil in proportions adapted to display the desired viscosity characteristic.

Figure 4:
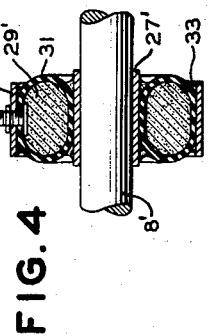
Fig. 4 is a cross-sectional view showing a modified form of the self-adjusting bearing.

Fig. 4 illustrates another embodiment of the invention wherein a shaft 8' is supported by a sleeve bearing 27' which is surrounded by and adhesively retained within a toroidal envelope 31 of flexible and tenacious sheet material and derives dynamic support from a quantity of one of the foregoing viscous plastic mediums 29, preferably polymerized methyl silicone or polyisobutylene, contained therein and filling envelope 31, the whole being supported in an outer mounting ring 32 of brass or other suitable rigid material to which it is affixed in any suitable manner, as by an adhesive 33.

Any off-centering motion of the shaft 8' to a parallel but displaced position causes said sleeve bearing 27' to compress the envelope 31 on the side which is in the direction of such motion, and to distend it on the opposite side of said shaft.

These simultaneous and complementary changes in cross-sectional area, on diametrically opposed sides of the shaft constitute a corresponding change in volume of the interior of the said envelope, with respect to radial angular position, of equal angular portions thereof. The deformable plastic medium enclosed in and filling said envelope is thus constrained to flow from the leading side of decreasing volume into the following side of increasing volume, to the extent that control exercised through the viscosity of said medium, as coupled to the said bearing by the structure described and appearing thereto as a mechanical resistance varying with the speed of such motion, allows such regulated motion to occur. In the case of a deformable medium which is both viscous and elastic, as elsewhere specified and described herein, sudden motion of the shaft is not only opposed during its continuance by the above described force of viscous deformation, but in addition thereto the force of elastic restoration in the said medium continues to exert a recentering influence on the said bearing after said off-centering motion has ceased, constituting a positive corrective influence throughout the period during which the said shaft is displaced from a centered position.

It is clear from the structure of Fig. 4 that although the shaft 8' is supported in a plain bushing 27', the flexibility of envelope 31 together with the plastic of the viscous deformable medium 29' provide a self-aligning as well as a self-centering structure, since axial misalignment between ring 32 and shaft 8' are accommodated by said envelope and by said medium without imposing flexural stress on the said shaft.

It will be obvious that various modifications and changes in the devices shown in the drawings and described herein may be made without departing from the spirit or essential attributes of the invention, and it is desired, therefore, that only such limitations be placed thereon as are specifically set forth in the appended claims.

What is claimed is:

1. A self-centering rotary shaft bearing assembly comprising in combination an angularly self-aligning shaft bearing, a retainer therefor surrounding and supporting said shaft bearing and having parallel sides radially disposed, a mounting frame slidably engaged by said sides of said retainer to partial depth of a recess therein, the said recess wholly surrounding said bearing, and a viscous deformable plastic damping medium substantially filling said recess, characterized by a logarithmic absolute viscosity coefficient having values between the limits of approximately 4 and 7, said viscosity being measured in poises at the temperature of use and being adapted to provide a fluidity permitting relatively slow lateral adjusting motion of said bearing, together with viscosity inhibiting leakage of said medium and any rapid radial motion of said bearing, whereby rotationally induced lateral vibrations of the said bearing are amortized.

2. In a self-adjusting auxiliary bearing, a combination consisting of a directionally adjustable bearing having an exterior portion in the shape of the mid-zone of a sphere, an enveloping retainer engaging said bearing comprising two adjacent parallel sided centrally perforated disks, said perforations being spherically hollowed to retain said bearing by frictional contact, means for securing said disks in rigid contact, a centrally perforated mounting having separable mating halves and having an annular recess on the inner surface thereof whereby it slidably engages to partial depth of the said recess, the outer portion of the radial sides of said retainer, means for securing said mating halves of said mounting in rigid contact, and a viscous deformable plastic medium substantially filling said recess, characterized by a logarithmic absolute viscosity coefficient having values between the limits of approximately 4 and 7, said viscosity being measured in poises at the temperature of use and being adapted to provide a fluidity permitting relatively slow lateral adjusting motion of said bearing, together with a viscosity inhibiting any leakage of said medium and any rapid radial motion of said bearing, whereby rotationally induced lateral vibrations of the said bearing are amortized.

3. The combination set forth in claim 2 wherein the said medium consists of a quantity of methyl silicone polymer characterized by the said logarithmic coefficient of absolute viscosity.

4. The combination set forth in claim 1 wherein the said medium consists of a quantity of polyisobutylene characterized by the said logarithmic coefficient of absolute viscosity combined, however, with a high degree of resilience whereby vibrations passing between the said bearing and the said mounting are amortized in the said medium.

5. The combination set forth in claim 1 wherein the said medium consists of a synthetic plastic polymer characterized by the said logarithmic coefficient of absolute viscosity in addition, however, to having a high degree of resilience, whereby vibrations passing between the said bearing and the said mounting are amortized in the said damping medium.

6. In a shaft bearing assembly, means for supporting a bearing for angular and lateral adjustability, consisting of the combination of closed container means having interior wall portions movable relative to each other to effect changes in the configuration of the chamber defined by said wall portions, said chamber wholly surrounding and being radially disposed around such bearing and having its interior wall portions controlled thereby to effect changes of configuration upon radial movement of such bearing while retaining substantially constant total internal volume, and a viscous deformable plastic damping medium substantially filling said container means, characterized by a logarithmic absolute viscosity coefficient having values between the limits of approximately 4 and 7, said viscosity being measured in poises at the temperature of use and being adapted to provide a fluidity permitting relatively slow lateral adjusting motion of said bearing, together with a viscosity inhibiting leakage of said medium and any rapid radial motion of said bearing, whereby rotationally induced transverse vibrations of the said bearing are amortized.

7. In a shaft bearing assembly, a means of support for a bearing comprising a retainer therefor adapted to surround and support a shaft bearing in a freely adjustable angular position and having parallel sides radially disposed, a mounting frame slidably engaged by said sides of said retainer to partial depth of a recess therein, the said recess wholly surrounding said bearing support, and a viscous deformable plastic damping medium essentially comprising methyl silicone polymer substantially filling said container means, characterized by a logarithmic absolute viscosity coefficient having values between the limits of approximately 4 and 7, said viscosity being measured in poises at the temperature of use and being adapted to provide a fluidity permitting relatively slow lateral adjusting motion of said bearing, together with viscosity adequate to inhibit any leakage of said medium and any rapid radial motion of said bearing, whereby rotationally induced transverse vibrations of the said bearing are amortized.

8. A self-adjusting auxiliary bearing assembly for a shaft, comprising a shaft bearing, closed container means wholly surrounding and supporting said shaft bearing and having interior wall portions movable and controlled thereby upon radial movement of said bearing to effect changes in configuration of said container means without substantially changing the internal volume thereof, and an incompressible damping medium having a logarithmic absolute viscosity coefficient lying between limits of approximately 4 and 7, and completely filling the said container means.

9. A self-adjusting auxiliary bearing assembly for a shaft, comprising a shaft bearing, closed container means having a toroidal shape wholly surrounding and supporting said shaft bearing and having interior wall portions movable and controlled thereby upon radial movement of said bearing to effect changes in configuration of said container means without substantially changing the internal volume thereof, and an incompressible damping medium having a logarithmic absolute viscosity coefficient lying between the limits of substantially about 4 and 7, and completely filling said container means.

10. A self-adjusting auxiliary bearing assembly for a shaft, comprising a shaft bearing, closed container means wholly surrounding and supporting said shaft bearing and having interior wall portions movable and controlled thereby upon radial movement of said bearing to effect changes in configuration of said container means without substantially changing the internal volume thereof, and an incompressible damping medium comprising methyl silicone polymer having a logarithmic absolute viscosity coefficient lying between the limits of substantially about 4 and 7, and completely filling said container means.

References Cited in the file of this patent

UNITED STATES PATENTS

| | | |
|---|---|---|
| 913,233 | Ponten | Feb. 23, 1909 |
| 1,913,513 | Rossman | June 13, 1933 |
| 2,155,919 | Wooler | Apr. 25, 1939 |

FOREIGN PATENTS

| | | |
|---|---|---|
| 578,989 | Great Britain | July 18, 1946 |

OTHER REFERENCES

Product Engineering (Silicone Putty), January 1950, pages 90–93.